United States Patent
Koshoubu

(10) Patent No.: US 7,903,253 B2
(45) Date of Patent: Mar. 8, 2011

(54) MICROSCOPE

(75) Inventor: Jun Koshoubu, Hachioji (JP)

(73) Assignee: JASCO Corporation, Hachioji-shi, Tokyo (JP)

( * ) Notice: Subject to any disclaimer, the term of this patent is extended or adjusted under 35 U.S.C. 154(b) by 0 days.

(21) Appl. No.: 12/613,586

(22) Filed: Nov. 6, 2009

(65) Prior Publication Data

US 2010/0110441 A1    May 6, 2010

Related U.S. Application Data

(63) Continuation of application No. 11/293,931, filed on Dec. 5, 2005, now abandoned.

(30) Foreign Application Priority Data

Dec. 6, 2004 (JP) ................................. 2004-352556

(51) Int. Cl.
G01B 9/02 (2006.01)

(52) U.S. Cl. ........................................................ 356/451

(58) Field of Classification Search .................. 356/451, 356/452, 456; 250/339.07, 339.08
See application file for complete search history.

(56) References Cited

U.S. PATENT DOCUMENTS

| | | | |
|---|---|---|---|
| 5,166,749 A | 11/1992 | Curbelo et al. | |
| 5,265,039 A | 11/1993 | Curbelo et al. | |
| 5,528,368 A * | 6/1996 | Lewis et al. | 356/456 |
| 5,835,214 A | 11/1998 | Cabib et al. | |
| 5,963,322 A | 10/1999 | Rapp et al. | |
| 6,274,871 B1 | 8/2001 | Dukor et al. | |
| 6,667,808 B2 | 12/2003 | Clermont et al. | |
| 7,057,733 B2 | 6/2006 | Carter et al. | |
| 2001/0052979 A1 * | 12/2001 | Treado et al. | 356/326 |
| 2002/0033452 A1 | 3/2002 | Hoult et al. | |

OTHER PUBLICATIONS

Japanese Patent Abstract for Publication No. 05-223640 published Aug. 31, 1993, one page.

* cited by examiner

*Primary Examiner* — Tarifur Chowdhury
*Assistant Examiner* — Jonathan M Hansen
(74) *Attorney, Agent, or Firm* — Rankin, Hill & Clark LLP

(57) ABSTRACT

A microscope comprising: a light sampler for collecting light from a measurement area of a sample; a multi-element detector having a plurality of photoelectric elements, for detecting the light collected by the light sampler, each photoelectric element corresponding to a minute measurement region in the measurement area with one-to-one correspondence; a Fourier transform spectrophotometer as a spectroscope; a data sampler for concurrently sampling intensity data sent from each photoelectric element of the multi-element detector at a timing determined by the Fourier transform spectrophotometer; and a data processor for obtaining time-resolved spectrum data for each minute measurement region according to temporally changed interference light data obtained by the data sampler.

3 Claims, 4 Drawing Sheets

MICROSCOPE

RELATED APPLICATIONS

This application claims priority to the Japanese Patent Application 2004-352556 dated on Dec. 6, 2004 and is hereby incorporated with reference for all purposes.

BACKGROUND OF THE INVENTION

1. Field of the Invention

The present invention relates to microscopes, and more particularly, to a mechanism therein for obtaining a time-resolved spectrum.

2. Prior Art

Time-resolved measurement apparatuses are used to measure temporal changes in samples. In the time-resolved measurement apparatuses, the entire sample is illuminated with interference light sent from an interferometer, and interference light coming from the sample is detected to obtain the temporally changed spectrum (for example, see Japanese Unexamined Patent Application Publication No. Hei-5-223640).

Recently, time-resolved measurement is also demanded for microscopes that perform imaging analysis of minute measurement regions.

In time-resolved measurement, it is necessary to measure spectra that change, for example, in microseconds to nanoseconds. To follow such spectral changes, the measurement speed of microscopes needs to be improved, but conventionally, there have been no technologies to make such an improvement.

SUMMARY OF THE INVENTION

The present invention was conceived in light of the above problem of the prior art, and the object thereof is to provide a microscope that can obtain time-resolved spectrum.

The microscope of the present invention to achieve the above object is a microscope comprises a light sampler and a multi-element detector. The multi-element detector has a plurality of photoelectric elements, each photoelectric element corresponding to a minute measurement region in the measurement area with one-to-one correspondence. The microscope comprises a Fourier transform spectrophotometer, a data sampler and a data processor.

The microscope unit collects light from a measurement area of a sample.

The multi-element detector has a plurality of photoelectric elements, detects the light collected by the light sampler.

The Fourier transform spectrophotometer has a moving mirror serving as an optical path difference generator in an interferometer. The Fourier transform spectrophotometer serves as a spectroscope for light incident on the measurement area and/or light coming from the measurement area.

The data sampler concurrently samples intensity data sent from each photoelectric element of the multi-element detector at a timing determined according to position information of the moving mirror, which is sent from the Fourier transform spectrophotometer.

The data processor obtains time-resolved spectrum data for each minute measurement region according to temporally changed interference light data obtained by the data sampler.

Multi-Element Detector

In this invention, it is preferred that the plurality of photoelectric elements of the multi-element detector is placed in one dimension.

This is because such a structure is advantageous in that intensity data from each photoelectric element can be concurrently sampled at a higher speed.

Rapid-Scanning Mode

In this invention, the Fourier transform spectrophotometer continuously moves the moving mirror at a high speed in a rapid-scanning mode. The data sampler concurrently samples the intensity data sent from each photoelectric element of the multi-element detector every time the moving mirror is moved by a constant distance, starting at a predetermined position. The data processor obtains the temporally changed interference light data according to intensity data at each sampling position in the rapid-scanning mode and further obtains the time-resolved spectrum data, for each minute measurement region.

Step-Scanning Mode

In this invention, the Fourier transform spectrophotometer discretely moves the moving mirror in a step-like manner in a step-scanning mode in order to perform time-resolved measurement for a periodic reaction. The data sampler concurrently samples the intensity data sent from each photoelectric element of the multi-element detector at each stop position of the moving mirror in the step-scanning mode every time a predetermined time elapses, starting at the beginning of the periodic reaction. The data processor obtains the temporally changed interference light data according to intensity data at each elapsed time, starting at the beginning of the periodic reaction and further obtains the time-resolved spectrum data, for each minute measurement region.

Measurement-Area Moving Unit

In this invention, the microscope further comprises a measurement-area moving unit for moving the measurement area. The measurement-area moving unit comprises a stage, a stage driver and a stage controller. The measurement area in the sample is moved by the movement of the stage.

The stage on which the sample is placed.

The stage driver moves the stage horizontally.

The stage controller controls the movement of the stage performed by the stage driver.

DESCRIPTION OF THE PREFERRED EMBODIMENTS

Figure 1:
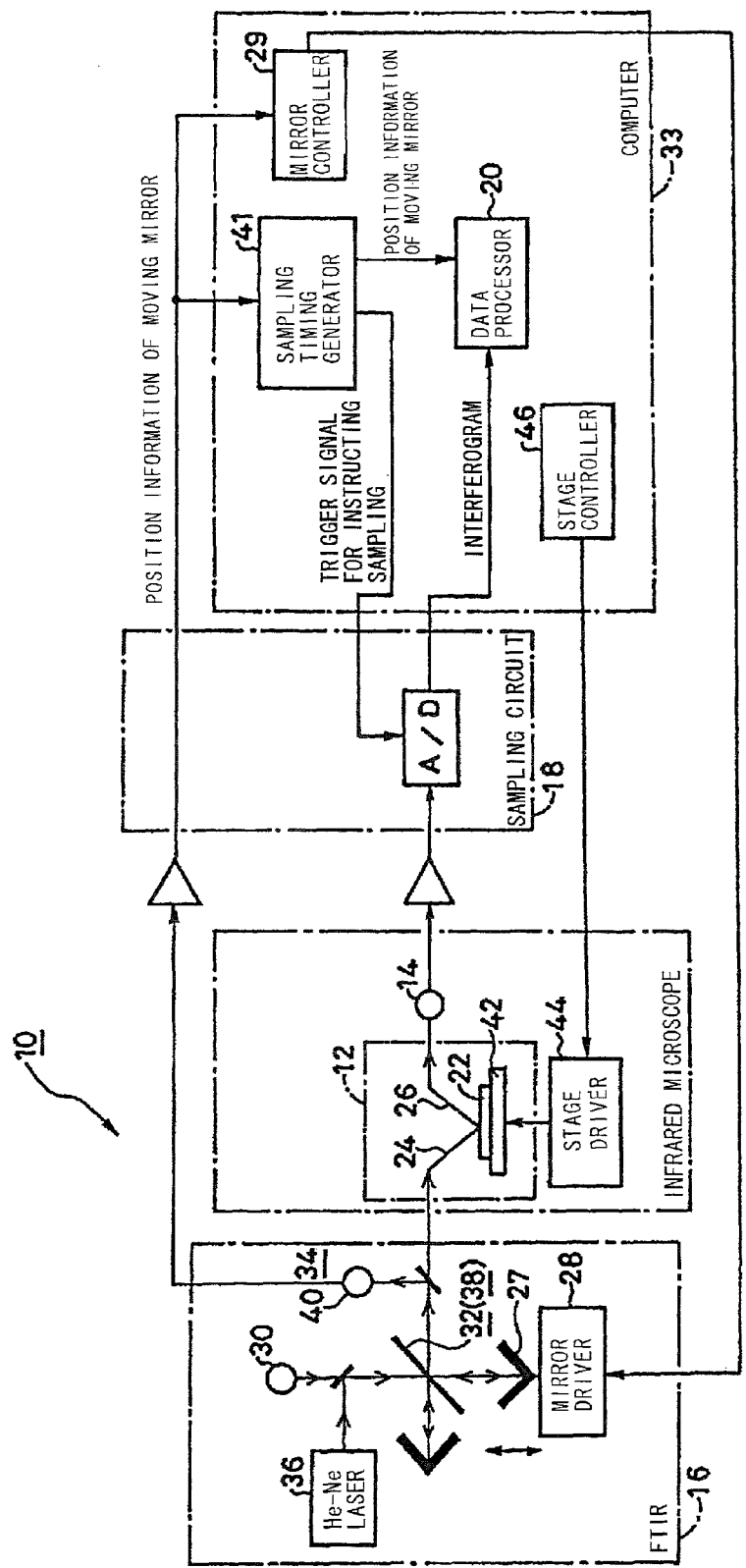
FIG. 1 is a view showing an outlined structure of an infrared microscope according to an embodiment of the present invention.

A preferred embodiment will be described below by referring to the drawings.

FIG. 1 shows an outlined structure of a multi-channel infrared microscope 10 according to an embodiment of the present invention.

In addition to an infrared microscope having a microscope unit (light sampler) 12 and a multi-element infrared detector (multi-element detector) 14, the multi-channel infrared microscope (microscope) 10 includes a Fourier transform infrared spectrophotometer (FTIR) 16, a sampling circuit (data sampler) 18, and a data processor 20.

The microscope unit 12 illuminates a measurement area of a sample 22 with interference light 24 and obtains interference light 26 coming from the measurement area.

The multi-element infrared detector 14 has a plurality of photoelectric elements disposed in one dimension and detects the interference light 26 coming from the measurement area.

An advantageous feature of the present invention is that a temporal change in each minute measurement region of the sample 22 can be measured in the infrared microscope of the multi-channel infrared microscope 10. To obtain this feature, as described above, the multi-element infrared detector 14 provided for the infrared microscope is combined with the Fourier transform infrared spectrophotometer 16 in the present embodiment. In addition, the sampling circuit 18 is provided in the present embodiment.

In the present embodiment, each photoelectric element in the multi-element infrared detector 14 handles a minute measurement region in the measurement area with one-to-one correspondence. The multi-element infrared detector 14 used in the present embodiment has a plurality of photoelectric elements disposed in one dimension because this allows intensity data to be sampled from the photoelectric elements more concurrently at a higher speed.

The Fourier transform infrared spectrophotometer 16 has a moving mirror 27. A moving mirror driver 28 and a moving mirror controller 29 are used to operate the moving mirror 27 in a rapid-scanning mode and a step-scanning mode.

The Fourier transform infrared spectrophotometer 16 further includes an infrared light source 30, a main interferometer 32, and a position detector 34 for obtaining position information of the moving mirror 27. The position detector 34 includes a He—Ne laser 36, a control interferometer 38 also serving as the main interferometer 32, and a He—Ne detector 40.

The sampling circuit 18 samples intensity data at a high speed from each photoelectric element of the multi-element infrared detector 14 concurrently by the use of a sampling timing generator 41.

The data processor 20 includes, for example, a computer 33 and obtains time-resolved spectrum data of each minute measurement region according to temporally changed interference light data sent from the sampling circuit 18.

In the present embodiment, a stage 42, a stage driver 44, and a stage controller 46 are also provided. The sample 22 is placed on the stage 42, and the stage 42 is moved to move the measurement area of the sample 22.

The stage driver 44 moves the stage 42 horizontally. The stage controller 46 controls the movement of the stage 42 performed by the stage driver 44.

In the present embodiment, microscopic measurement of temporal changes can be performed accurately, which was very difficult to conduct in conventional infrared microscopes.

Conventionally, a multi-element infrared detector is used to obtain temporally changed interference light data of one measurement area in a time-sequential manner. More specifically, the photoelectric elements of the multi-element infrared detector are sequentially scanned to output intensity data corresponding to each photoelectric element in a time-sequential manner. Based on the time-sequential data obtained in this way, temporally changed spectrum data of the entire sample is obtained.

In contrast, in the present embodiment, to obtain temporally changed spectrum data of each minute measurement region in a sample, a combination of an existing multi-element infrared detector in an infrared microscope and a Fourier transform infrared spectrophotometer is employed.

<Multi-Element Infrared Detector>

In the present embodiment, the multi-element infrared detector 14 is used not to obtain intensity data of the entire sample in a time-sequential manner but to obtain a surface intensity distribution. Each photoelectric element of the multi-element infrared detector 14 corresponds to one minute measurement region of the measurement area with one-to-one correspondence.

<Sampling>

In the present embodiment, the sampling circuit 18 is used not to sequentially scan the photoelectric elements of the multi-element infrared detector but to concurrently sample data from each photoelectric element at a timing determined by the Fourier transform infrared spectrophotometer.

<Data Processing>

In the present embodiment, the data processor 20 obtains temporally changed interference light data from intensity data of each minute measurement region of the measurement area, obtained by the sampling circuit 18. The data processor 20 applies a Fourier transform to the temporally changed interference light data for each minute measurement region of the measurement area to obtain time-resolved spectrum data.

As a result, a temporal change in each minute measurement region of the sample 22 can be measured in the present embodiment.

Rapid-Scanning Mode

The acquisition of a time-resolved spectrum in the rapid-scanning mode of the moving mirror 27 will be described next.

The Fourier transform infrared spectrophotometer 16 continuously moves the moving mirror 27 at a high speed.

The sampling circuit 18 concurrently samples intensity data from each photoelectric element of the multi-element infrared detector 14 every time the moving mirror 27 moves by a constant distance, starting at a predetermined position. The zero-crossing points of a laser interference signal (position information of the moving mirror 27) obtained from the position detector 34 and the sampling timing generator are used as timing points sent from the Fourier transform infrared spectrophotometer 16, which are used to control the sampling of the intensity data.

<Data Processing>

The data processor 20 obtains temporally changed interference light data from the intensity data for each minute measurement region at each sampling position in the rapid-scanning mode. The data processor 20 applies a Fourier transform to the temporally changed interference light data to obtain time-resolved spectrum data.

The acquisition of the time-resolved spectrum data will be described more specifically by referring to FIG. 2.

Figure 2:
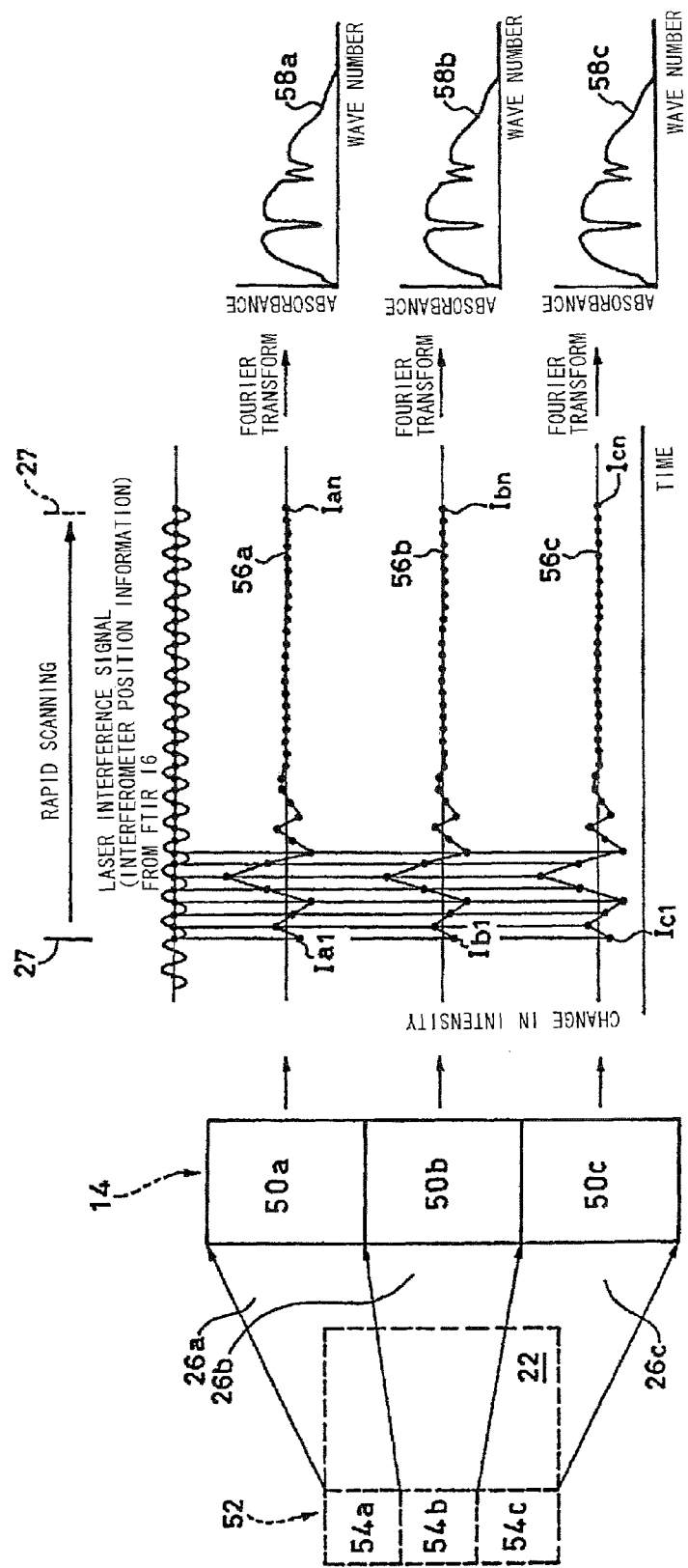
FIG. 2 is a view showing the acquisition of a time-resolved spectrum performed when a Fourier transform spectrophotometer shown in FIG. 1 operates in a rapid-scanning mode.

In FIG. 2, photoelectric elements 50a to 50c of the multi-element infrared detector 14 correspond to minute measurement regions 54a to 54c of a measurement area 52 with one-to-one correspondence.

The photoelectric element 50a samples the intensity of interference light 26a coming from the minute measurement region 54a. The photoelectric element 50b samples the intensity of interference light 26b coming from the minute measurement region 54b. The photoelectric element 50c samples the intensity of interference light 26c coming from the minute measurement region 54c.

<Sampling>

In the present embodiment, at time $t_1$ from the start of sampling, for example, intensity data $I_{a1}$ from the photoelectric element 50a, intensity data $I_{b1}$ from the photoelectric element 50b, and intensity data $I_{c1}$ from the photoelectric element 50c are concurrently sampled at a high speed. This operation is performed at a predetermined number of points every time the moving mirror 27 is moved by the constant distance. At time $t_n$, intensity data $I_{an}$ from the photoelectric element 50*a*, intensity data $I_{bn}$ from the photoelectric element 50*b*, and intensity data $I_{cn}$ from the photoelectric element 50*c* are concurrently sampled at a high speed. This operation is performed at the predetermined number of points every time the moving mirror 27 is moved by the constant distance.

With the foregoing sampling, n temporally changed interference light data items are obtained at constant time intervals for each minute measurement region.

<Data Processing>

The computer 33 obtains the temporally changed interference light data for each minute measurement region as described above.

The computer 33 then applies a Fourier transform to each of the n temporally changed interference light data items obtained at constant time intervals (at $t_1, t_2, \ldots,$ and $t_n$) for each minute measurement region to obtain time-resolved spectrum data.

The computer 33 applies a Fourier transform to interferogram data 56*a* corresponding to the minute measurement region 54*a* to obtain time-resolved spectrum data 58*a*. The computer 33 applies a Fourier transform to interferogram data 56*b* corresponding to the minute measurement region 54*b* to obtain time-resolved spectrum data 58*b*. The computer 33 applies a Fourier transform to interferogram data 56*c* corresponding to the minute measurement region 54*c* to obtain time-resolved spectrum data 58*c*.

As described above, according to the multi-channel infrared microscope 10 of the present embodiment, microscopic measurement of temporal changes can be performed in the form of images. The above-described time-resolved measurement is performed in the present embodiment with the use of the infrared microscope having the multi-element infrared detector 14, and the Fourier transform infrared spectrophotometer 16 capable of rapid scanning. As a result, in the rapid scanning mode, a surface distribution can be obtained in time-resolved measurement of millisecond-order for one-time reactions.

Step Scanning Mode

In the present embodiment, it is preferred as described above that the moving mirror 27 be operated in the rapid scanning mode. It is also preferred that the step scanning mode be used to measure a temporal change of periodic reactions.

Conventionally, in the step scanning mode, intensity data obtained from all elements of a multi-element infrared detector is sequentially scanned at each stop position of a moving mirror to obtain intensity data corresponding to each element in a time-sequential manner. The time-resolved spectrum data of the entire sample is obtained from the intensity data obtained in that way.

In contrast, in the present embodiment, to obtain time-resolved spectrum data not for the entire sample but for each minute measurement region, it is preferred that the following time-resolved measurement be performed.

The acquisition of a time-resolved spectrum in the step-scanning mode of the moving mirror 27 of the interferometer will be described next, specifically by referring to FIG. 3A to FIG. 3C.

The Fourier transform infrared spectrophotometer 16 moves the moving mirror 27 discretely in a step-like manner.

<Sampling>

The sampling circuit 18 concurrently samples intensity data from each photoelectric element of the multi-element infrared detector 14 at each stop position of the moving mirror 27 at predetermined time intervals, starting at the beginning of a periodic reaction.

Figure 3A:
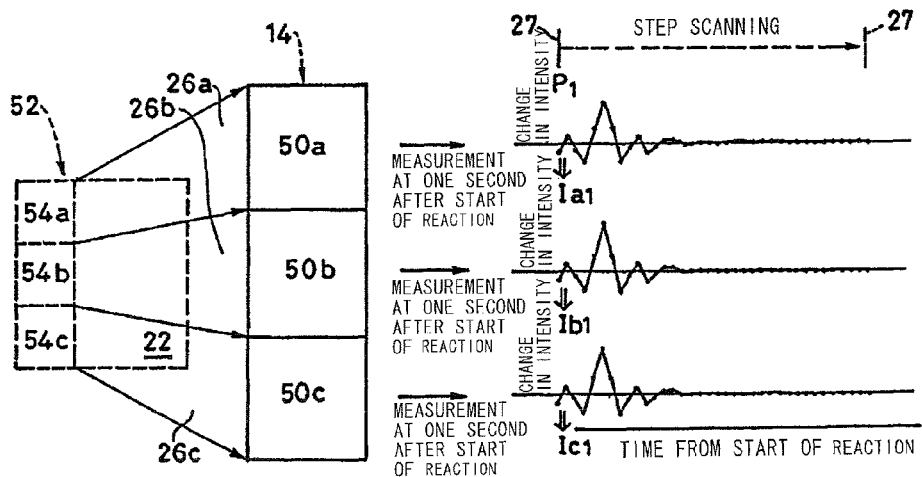
FIGS. 3A to 3C are views showing the acquisition of a time-resolved spectrum performed when the Fourier transform spectrophotometer shown in FIG. 1 operates in a step-scanning mode.

At a stop position $P_1$ of the moving mirror 27, as shown in FIG. 3A, intensity data $I_{a1}$ from the photoelectric element 50*a*, intensity data $I_{b1}$ from the photoelectric element 50*b*, and intensity data $I_{c1}$ from the photoelectric element 50*c* are concurrently measured at predetermined time intervals, starting at the beginning of the periodic reaction.

Figure 3B:
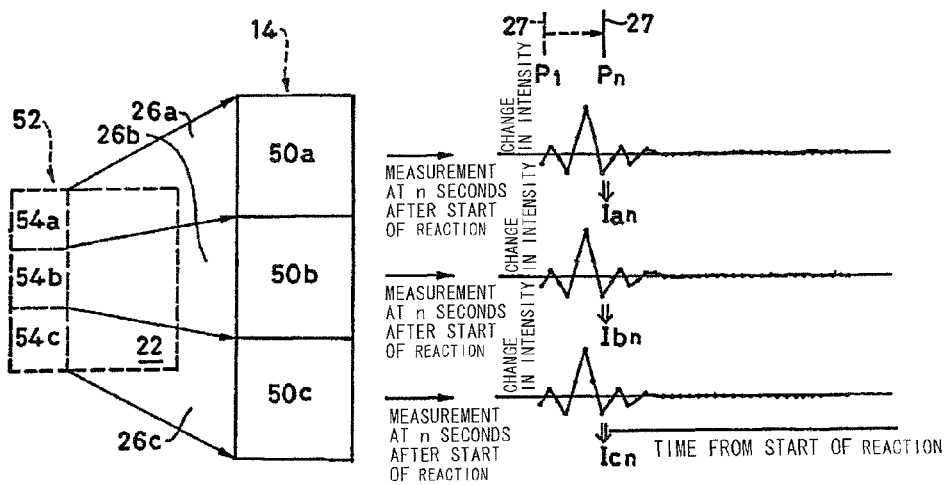

At a stop position $P_n$ of the moving mirror 27, as shown in FIG. 3B, intensity data $I_{an}$ from the photoelectric element 50*a*, intensity data $I_{bn}$ from the photoelectric element 50*b*, and intensity data $I_{cn}$ from the photoelectric element 50*c* are concurrently measured at predetermined time intervals, starting at the beginning of the periodic reaction.

<Data Processing>

The computer 33 obtains an interferogram (temporally changed interference light data) formed of the intensity data corresponding to the stop positions $(P_1, P_2, \ldots,$ and $P_n)$ of the moving mirror 27 for each minute measurement region according to the intensity data obtained at each stop position of the moving mirror 27 at each sampling time.

Figure 3C:
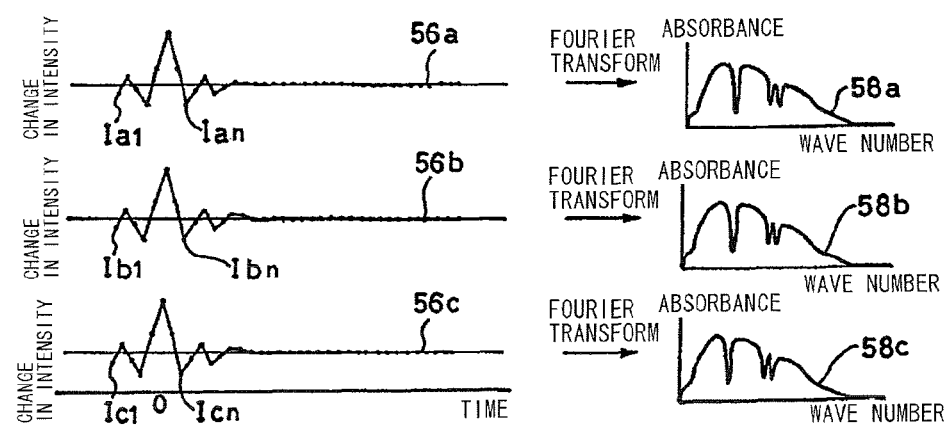

More specifically, the computer 33 obtains an interferogram (temporally changed interference light data) 56*a* formed of the intensity data $(I_{a1}, I_{a2}, \ldots,$ and $I_{an})$ corresponding to the stop positions $(P_1, P_2, \ldots,$ and $P_n)$ of the moving mirror 27 for the minute measurement region 54*a*, as shown in FIG. 3C. The computer 33 obtains an interferogram (temporally changed interference light data) 56*b* formed of the intensity data $(I_{b1}, I_{b2}, \ldots,$ and $I_{bn})$ corresponding to the stop positions $(P_1, P_2, \ldots,$ and $P_n)$ of the moving mirror 27 for the minute measurement region 54*b*, as shown in FIG. 3C. The computer 33 obtains an interferogram (temporally changed interference light data) 56*c* formed of the intensity data $(T_{c1}, I_{c2}, \ldots,$ and $I_{cn})$ corresponding to the stop positions $(P_1, P_2, \ldots,$ and $P_n)$ of the moving mirror 27 for the minute measurement region 54*c*, as shown in FIG. 3C.

In the present embodiment, when intensity data each having a predetermined time delay from the periodic reaction have been sampled a predetermined number of times at a certain stop position of the moving mirror 27, the moving mirror 27 is moved to the next stop position, and intensity data having a time delay corresponding to the next stop position is sampled in the same way. Sampling is performed with a time delay corresponding to each stop position, and measurement is conducted a target number of times. An interferogram formed of intensity data with each time delay is obtained for each minute measurement region.

Then, the computer 33 obtains time-resolved spectrum data according to each interferogram, as shown in FIG. 3C.

Specifically, the computer 33 applies a Fourier transform to the interferogram data 56*a* corresponding to the minute measurement region 54*a* to obtain time-resolved spectrum data 58*a*. The computer 33 applies a Fourier transform to the interferogram data 56*b* corresponding to the minute measurement region 54*b* to obtain time-resolved spectrum data 58*b*. The computer 33 applies a Fourier transform to the interferogram data 56*c* corresponding to the minute measurement region 54*c* to obtain time-resolved spectrum data 58*c*.

Microscopic measurement of temporal changes is performed in the present embodiment with the use of the infrared microscope having the multi-element infrared detector 14, and the Fourier transform infrared spectrophotometer 16 capable of step scanning. As a result, a surface distribution can be obtained in time-resolved measurement of microsecond-order for periodic reactions.

In the present embodiment, to maintain reproducibility of the start of the periodic reaction, it is preferred that an excitation light source, such as a unit emitting short pulses, be used. To perform successful sampling, it is also preferred in the present embodiment that a delay unit capable of specifying a time delay for a sampling time according to each stop position of the moving mirror 27 be provided.

<Measurement-Area Moving Unit>

It is also important in the above-described structure that the measurement area can be moved in order to obtain a surface distribution over a wider area of a sample. For this purpose, the stage 42, the stage driver 44, and the stage controller 46 serve as a measurement-area moving unit.

When measurement has been finished at a certain measurement area, the measurement-area moving unit moves the sample so that measurement can be performed at the next measurement area. Then, time-resolved measurement is performed at the next measurement area in the same way. Time-resolved measurement at each measurement area and changing the movement area by the measurement-area moving unit are repeated until time-resolved measurement is finished for all target areas.

<Selection of Multi-Element Detector>

In the above-described embodiment, a multi-element detector in which the photoelectric elements are disposed in one dimension is used. This is because such a structure is advantageous in that intensity data from each photoelectric element can be concurrently sampled at a higher speed. A multi-element detector in which all photoelectric elements are disposed two dimensionally can be used instead.

Although a multi-element detector having photoelectric elements disposed in one dimension is slightly affected by light coming from adjacent measurement regions, it can concurrently measure a smaller number of measurement regions than a multi-element detector having photoelectric elements disposed two dimensionally. Since highly precise measurement is especially important in the above-described embodiment compared with a reduction in measurement time, it is preferred that a multi-element detector having photoelectric elements disposed in one dimension be used.

A multi-element detector having photoelectric elements disposed two dimensionally can concurrently measure a larger number of measurement regions than a multi-element detector having photoelectric elements disposed in one dimension, but it is significantly affected by light coming from adjacent measurement regions. When a reduction in measurement time is especially important in the above-described embodiment compared with highly precise measurement, a multi-element detector having photoelectric elements disposed two dimensionally can be used.

Effectiveness

As described above, the microscope of the present invention includes the multi-element detector, the Fourier transform spectrophotometer serving as the spectroscope, and the data sampler for concurrently sampling intensity data from each photoelectric element of the multi-element detector at timing determined by the spectrophotometer. As a result, the time-resolved spectrum is obtained in the present invention.

In combination with the measurement-area moving unit, sample-surface analysis can be performed at a high speed in the present invention.

What is claimed is:

1. A method of obtaining a time-resolved spectrum of a sample undergoing a reaction, the method comprising:
    a. providing a microscope comprising:
        i. a light sampler for collecting light from a measurement area of a sample undergoing a reaction;
        ii. a multi-element detector having a plurality of photoelectric elements, for detecting the light collected by the light sampler, each photoelectric element corresponding to a minute measurement region in the measurement area with one-to-one correspondence;
        iii. a Fourier transform spectrophotometer having a moving mirror serving as an optical path difference generator in an interferometer, the Fourier transform spectrophotometer serving as a spectroscope for at least one of light incident on the measurement area and light coming from the measurement area, the moving mirror capable of moving through and stopping at a plurality of mirror stop positions, $P_1$, $P_2$, $P_3$, ..., $P_n$;
        iv. a data sampler for concurrently sampling intensity data sent from each photoelectric element of the multi-element detector at a timing determined according to position information of the moving mirror, which is sent from the Fourier transform spectrophotometer; and
        v. a data processor for obtaining time-resolved spectrum data for each minute measurement region according to temporally changed interference light data obtained by the data sampler;
    b. generating an optical path difference using an interferometer;
    c. irradiating interference light generated in step (b) to a sample and collecting light from a measurement area of the sample;
    d. detecting the light collected by the light sampler using a multi-element detector having a plurality of photoelectric elements, each photoelectric element corresponding to a minute measurement region in the measurement area with one-to-one correspondence;
    e. initiating a reaction after the moving mirror is positioned at a stop position $P_1$;
    f. sending a trigger signal to a data sampler for initiating sampling of intensity data at a predetermined constant interval, $t_1, t_2, \ldots, t_x$, using a sampling timing generator, when the sampling timing generator receives a signal that a reaction has started;
    g. sampling, using the data sampler, intensity data sent from each photoelectric element, according to the predetermined constant interval, $t_1, t_2, \ldots, t_x$; and
    h. moving the mirror to a subsequent stop position $P_2$ and repeating steps (b) through (g);
    i. repeating steps (b) through (g) for remaining stop positions $P_3, P_4, \ldots, P_n$;
    j. obtaining a spectrum data at $t_1$, using the data processor, according to the obtained intensity data at $t_1$, at all of the stop positions $P_1$ to $P_n$; and
    k. obtaining the time resolved spectrum data for each minute measurement region by repeating step (j) for remaining $t_2, t_3, \ldots, t_x$.

2. The method of claim 1, wherein the plurality of photoelectric elements of the multi-element detector is disposed in one dimension.

3. The method of claim 1, wherein the microscope further comprises a measurement-area moving unit which moves the measurement area, the measurement-area moving unit comprising:
    a stage on which the sample is placed;
    a stage driver which moves the stage horizontally; and
    a stage controller which controls the movement of the stage performed by the stage driver,
and wherein the method further comprises moving the measurement area of the sample by moving the stage.

* * * * *